June 25, 1963  W. R. COLLIER  3,095,164
GAS COUPLING SYSTEM FOR VTOL AIRCRAFT
Filed May 27, 1960
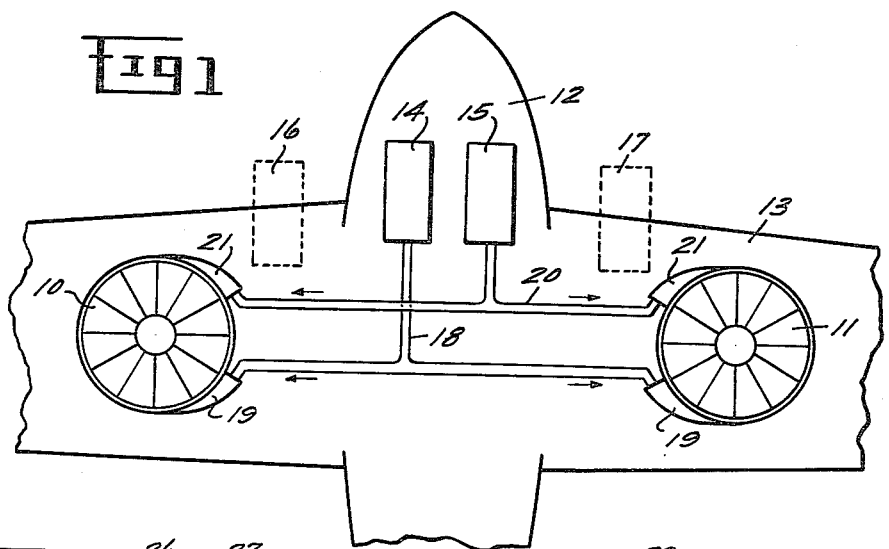
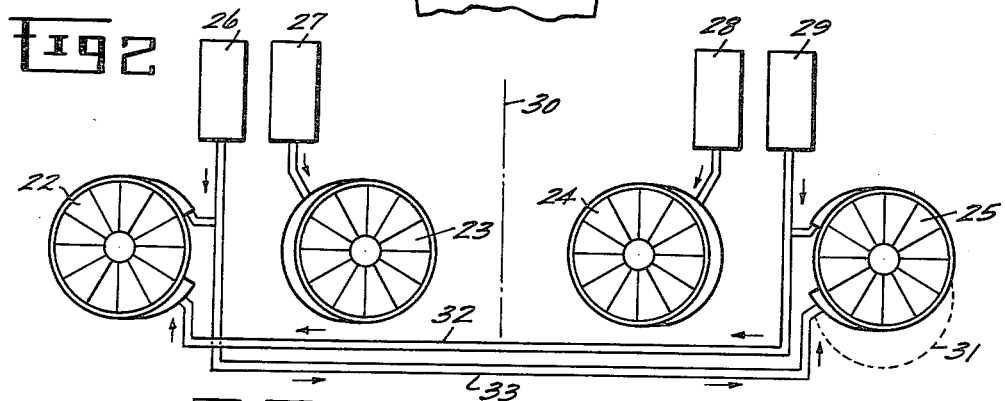
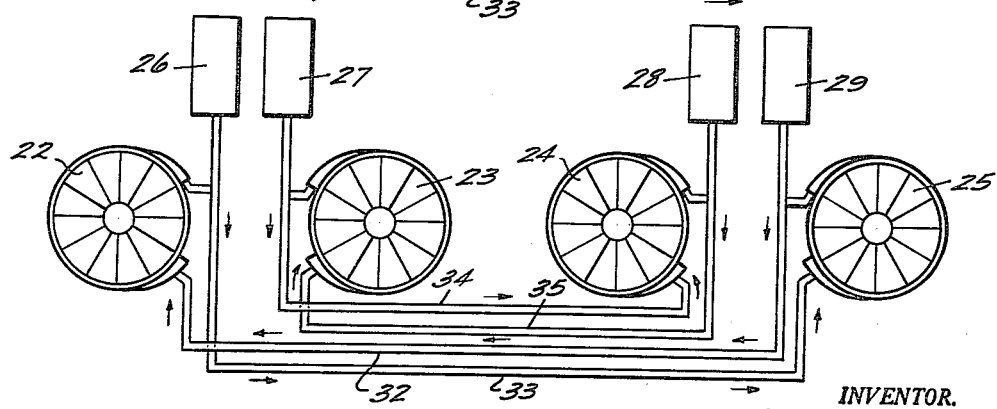
INVENTOR.
WILLIAM R. COLLIER
BY
John F. Cullen
ATTORNEY—

United States Patent Office 3,095,164
Patented June 25, 1963

3,095,164
GAS COUPLING SYSTEM FOR VTOL AIRCRAFT
William R. Collier, Madeira, Ohio, assignor to General
Electric Company, a corporation of New York
Filed May 27, 1960, Ser. No. 32,162
6 Claims. (Cl. 244—12)

The present invention relates to a coupling system for an air supported vehicle and, more particularly, to a gas coupling duct system for air supported vehicles such as VTOL aircraft.

In VTOL—vertical take-off and landing—aircraft a system that has come into prominence is the use of lift fans mounted in the vehicle wings or fuselage. By movement of large quantities of low pressure air through the fans, vertical lift may be obtained. Then the vehicle, if an aircraft, may continue in a vertical direction until suitable altitude is obtained at which time conversion can be made to horizontal movement by suitable jet reaction. This may be done by additional jet engines in the normal fashion or by diverting the fan discharge by louvers or suitable valves to provide a horizontal component. Obviously, in those vehicles such as aircraft, it is essential that balance be maintained at all times for suitable operation. While the loss of a gas generator on a ground airborne vehicle which rides a few inches above the ground, such as the Hovercraft or Levacar type, may not be serious, it could be fatal in an aircraft. During horizontal movement the normal ailerons provide roll control in a well known manner. However, in VTOL vehicles, during the hovering position, there is no movement of the air across the wing to provide this control and some means must be utilized to provide roll control or avoid any tendency to roll in the event of failure of a gas generator or fan. The control system should utilize components which do not enlarge the wings and add unnecessary weight to the aircraft. One scheme of roll control, when the ducting is simplified, is to be able to transfer power from one fan into another in order to provide the roll control and a cross-coupling arrangement between the various fans is provided so this power transfer may take place. Such an arrangement is the subject of copending application Serial Number 32,163 filed concurrently herewith and assigned to the assignee of the instant invention. Another possible arrangement is to avoid unbalanced moments on the failure of a fan or engine so that rebalancing is not necessary in order to avoid roll and, in some cases, any delay due to pilot reaction time is avoided. Such an arrangement is the subject of the instant invention as opposed to the power transfer method of the above mentioned application.

In VTOL aircraft it is anticipated that specifications will require continued flight during failure of any gas generator or with one engine out. With more than one engine out the aircraft must be able to maintain its balance and may or may not, depending on the capacity designed into it, continue to fly. However, it is essential that, even with two engines out, the plane must be able to come down gently and in a level position.

The present invention is directed to the avoidance of roll or the setting up of a couple tending to roll the vehicle such as an aircraft, in the event of engine failure. If a couple is present, it is intended to be small so that corrective action may immediately be taken. However, primarily the invention is directed at a ducting and gas coupling system to avoid a roll in the event of an engine failure.

The main object of the present invention is to provide a gas coupling system for an air supported vehicle which is arranged to avoid the setting up of a moment tending to roll the vehicle in the event of an engine failure.

Another object is to provide a system which may avoid the delay in roll correction due to pilot reaction time.

Another object is to provide such a system wherein the ducting arrangement is such that a substantial amount of lift may be maintained even on engine failure.

Another object is to provide such a coupling system by which an aircraft can be balanced rapidly and easily if a couple does occur on engine or fan failure.

Another object is to provide such a system by which an aircraft may be balanced with more than one engine out and which operates with one engine out to avoid roll and sudden loss of lift.

Briefly stated, I provide a gas coupling system for an air supported vehicle which has at least two gas generators, hereinafter referred to as engines, and at least two fans with ducts interconnecting the fans and engines so the fans are driven by the engines. Preferably, each fan is fed by at least two engines and receives its total power therefrom. The fans and engines are disposed symmetrically about the vehicle centerline so that a moment is not generally introduced upon the failure of the power supply components.

While the specification concludes with claims particularly pointing out and distinctly claiming the subject matter which I regard as my invention, it is believed the invention will be better understood from the following description taken in connection with the accompanying drawing in which:

FIGURE 1 is a diagrammatic plan view showing of a two fan and two gas generator air supported vehicle such as an aircraft;

FIGURE 2 is a view similar to FIGURE 1 showing a four fan and four gas generator system; and FIGURE 3 is a view similar to FIGURE 2 showing a modified four fan and four gas generator system.

While the invention will be particularly described in connection with a VTOL aircraft, it should be appreciated that it is applicable to an air supported vehicle of the type that might run a few inches above the ground. However, the main application is in an aircraft of the VTOL type and it will be so described. Also, it will be apparent that the fans may be mounted in the aircraft in any suitable arrangement as will be apparent, the most common arrangement being wing mounted fans, although the invention is not restricted to such mounting except insofar as called for by particular claims.

The use of a common duct, into which the gas generators or engines all discharge creates some problems in some installations. By eliminating the common duct for all the gas generators the control problem of the gas generators and making them independent of one another, i.e., independent in the sense they do not exhaust into a common duct, is simplified. The reason for this is that back pressure on one gas generator in a common duct may affect other generators on the same line to change their operation. By avoiding the common duct system it is not necessary to match temperatures, pressures, gas flows, and speeds in order to bring them all on the line. By avoiding the common duct feature where possible the control of the gas generators or engines is simplified.

Referring first to FIGURE 1, there is shown a diagrammatic plan view of a typical two fan two gas generator installation illustrating the present invention. Such an installation may comprise tip turbo fans 10 and 11 of a conventional type as shown in U.S. Patent 2,939,649 mounted in side-by-side or fore-and-aft relation within a fuselage and symmetrically disposed with respect to the longitudinal centerline of the fuselage 12 and, in FIGURE 1, on opposite sides of the line in wings 13 as shown. It will be understood that the movement of air vertically through fans 10 and 11 will provide vertical lift to the aircraft in the manner desired and that horizontal movement may take place by a number of means not important to the particular invention herein described.

In order to provide motion to fans 10 and 11 to pump air therethrough, suitable gas generators, which may be jet engines and are called engines hereinafter for convenience, are provided at 14 and 15 as shown. These engines may be disposed in the fuselage as shown or may be disposed outside of the fuselage in the wing 13 as shown schematically at 16 and 17. In either case, they are disposed symmetrically about the vehicle centerline as are the fans.

In order to avoid the setting up of a couple tending to roll the aircraft in the event of engine or fan failure, a suitable gas coupling system is employed which splits the power from the engine and directs it by exhaust gas to each fan. Thus, the fans and engine 14 are interconnected by duct 18 which is bifurcated as shown and connected through scrolls 19 to partially feed and directly drive each fan by exhaust gases. It can be seen that each fan then receives some or half, in the illustration shown, of its power from common engine 14 in FIGURE 1. Similarly, both fans are interconnected with engine 15 by duct 20 which is also bifurcated to feed scroll 21 of each fan so again each fan receives half its power directly by exhaust gas from common engine 15. With this arrangement, in the event of engine failure, no roll can be introduced requiring correction. So there is, in effect, an automatic roll control or correcting system. If engine 14 should fail, each fan 10 and 11 will still receive power from engine 15 and the aircraft remains balanced. Depending on whether or not sufficient excess power is designed into the engines, continued flight may or may not be possible but the aircraft will maintain a level attitude and retain sufficient lift so that it may be set down without fear of destruction.

It is characteristic of fan systems that the lower the pressure ratio across the fan, the larger is the amount of lift per unit of horsepower. Consequently, in the example just described, the loss of engine 14, which represents half the power of the aircraft, does not result in loss of half the lift of the fans. Since each fan 10 and 11 receives less power on the loss of engine 14, both fans slow down and pump at a lower pressure ratio. So long as the efficiency is not seriously deteriorated the lift does not drop rapidly. It is also characteristic of the fans that the efficiency plots are such that reduction from 100 percent power to half power seldom loses more than two or three points of efficiency. Thus, the loss of an engine 14 does not result in loss of half the lift, but, in the illustration just given, the fans 10 and 11 can produce up to 63 percent of the original lift which can be sufficient to allow the aircraft to descend slowly. With this system it is to be noted that there are two benefits obtainable. With the coupling system shown no severe unbalanced moment is introduced and the aircraft remains level. Secondly, the lift does not fall to half value with the loss of one of the engines and the aircraft can descend safely. It is even possible if accounted for in the design, that the remaining engine may have its throttle advanced and the lift can be substantially increased above the 63 percent mentioned even with the loss of an engine.

Referring next to FIGURE 2, there is shown a four fan four engine system with diagrammatic connections to illustrate the invention. Since this arrangement may be placed within the aircraft fuselage or wings in any suitable manner, they are not shown but may follow the outline shown in FIGURE 1 or, as shown, may employ both fans and engines in the wings. In this figure, four fans 22, 23, 24 and 25 are provided and generally will be wing mounted. In addition, four engines 26, 27, 28 and 29 are provided to drive the fans. Again a symmetrical disposition of the engine-fan combination is provided about the longitudinal centerline 30 of the aircraft. While it will be apparent that balance or roll control is maintained or avoided by the coupling systems shown herein, it will be appreciated that off-setting the fans slightly may compensate for pitch also. Thus, in FIGURE 2, fan 25 may be off-set as shown dotted at 31 to provide a couple in the pitch control direction. The rest of the connections are identical and the symmetrical fans are merely off-set as shown. Since this is quite obvious, no further mention will be made of this feature.

The particular gas coupling system shown in FIGURE 2 comprises a pair of outboard fans 22 and 25 fed by two engines 26 and 29 in a manner identical to that described in connection with FIGURE 1. Thus, each fan receives half of its power from each engine by the ducts 32 and 33 connecting engine 29 with fans 22 and 25 and connecting engine 26 with fans 22 and 25 respectively. Additional wing fans and connected gas generators are provided in this modification. Fan 23 receives all its power from engine 27 connected thereto and fan 24 receives all its power from engine 28 and these fan-engine sets are independent of each other and the interconnected system involving the other fans and generators. It can be seen that this arrangement requires two ducts 32 and 33 to pass through the wing of the aircraft. The additional sets of fan-engine combinations are preferably disposed inboard of the fans 22 and 25 as shown for reasons to be explained.

With this arrangement, it can be seen that failure of either engine 26 or 29 does not create any unbalance in the aircraft since fans 22 and 25 then receive power from the remaining engine. Thus, no unbalancing couple is introduced on failure of either of these engines. Since the engine-fan combinations 27—23 and 28—24 are disconnected from the other fans and generators and independent thereof and of each other, a roll moment will be introduced upon the failure of either engine 27 or 28. However, by placing these fans inboard of the interconnected fans the moment arm from the centerline 30 is lower and the roll moment is consequently lower. Further, it is necessary to shut down its counterpart on the opposite side of the centerline 30. Thus, if engine 27 fails in this arrangement, it would be necessary to close down engine 28 in order to maintain balance. However, this can be handled with the normal engine control by the pilot.

Referring next to FIGURE 3, there is shown a four fan four engine arrangement which is a dual arrangement of the type shown and described in FIGURE 1. Since part of the system of FIGURE 2 is common herein, the same reference numerals have been applied for convenience. In this system, two independent FIGURE 1 systems are employed to avoid setting up any moments on engine failure. Thus, no corrective action is required and the system is fully and automatically compensated for roll. Each fan 22 and 25 receives half of its power by direct exhaust from engines 26 and 29 through interconnecting ducts 33 and 32 respectively. Similarly, fans 23 and 24 are interconnected and each receives half its power from engines 27 and 28 through ducts 34 and 35 respectively. The inboard fans 23 and 24 and their connected engines 27 and 28 are independent of outboard fans except as they may cooperate therewith for roll control. Thus, it can be seen that the failure of engine 26 reduces the power to fans 22 and 25 equally so that no moment is introduced. Similarly, the failure of engine 27 cuts the power to fans 23 and 24 in half and no moment is introduced. In this system, of course, four ducts 32, 33, 34 and 35 are required. As stated before, the loss of power to any of the fans results in a lower pressure ratio across the fans and an increase in the amount of lift per unit of horsepower supplied to the fans so that the loss of any single engine does not reduce the lift proportionally. For example, with one engine inoperative at least 83 percent lift can be maintained. Consequently, it may be possible to stay aloft on two engine failures in the FIGURE 3 modification if sufficient over-speed capabilities are designed into the engines so that the speed of the remaining two may be temporarily increased to maintain an increased lift.

It should be noted that in each of the modifications shown, each fan, with the exception of the inboard fans of FIGURE 2, receives half the power output from an engine common to it and another fan. This 50-50 division of power permits, in most cases, balance to be maintained since no roll moment is introduced. In the inboard engines and fans of FIGURE 2, the engines supply all the power to the fans so that some compensation must be made on the failure of engine 27 or 28 to compensate for roll.

Thus, with these modifications, either no roll is introduced or in the one FIGURE 2 modification where it is introduced, it is easily corrected and compensated. In addition, the loss of engine power does not, by the coupling system herein disclosed, result in a large loss of lift so that engine out conditions may be tolerated with full safety to the aircraft.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A gas coupling system for an air supported vehicle comprising, at least two gas generators and at least two fans symmetrically disposed about the longitudinal centerline of the vehicle, ducts interconnecting the fans and gas generators whereby the gas generator exhaust directly drives the fans, two of said fans being connected to and gas driven by a single gas generator, each fan receiving some of its power from said gas generator, and said gas generators are independent of each other.

2. A gas coupling system for a VTOL aircraft comprising, a pair of gas generators and a pair of fans symmetrically disposed on each side of the longitudinal centerline of the aircraft, ducts connecting each gas generator with each fan whereby each fan receives some of its power by direct exhaust from each gas generator, and said gas generators are independent of each other.

3. A gas coupling system for a VTOL aircraft comprising, two wing mounted fans, two gas generators, the fans and gas generators being symmetrically disposed on each side of the longitudinal centerline of the aircraft, ducts connecting each gas generator with each fan whereby each fan receives some of its power by direct exhaust from each gas generator, and said gas generators are independent of each other.

4. Apparatus as described in claim 3 having an additional wing fan and duct connected gas generator symmetrically disposed in each wing, each additional wing fan receiving all its power by direct exhaust from its connected gas generator and each additional fan and gas generator being independent of all other fans and gas generators.

5. Apparatus as described in claim 3 having an additional two fan-two gas generator combination connected in the same manner as said first mentioned fans and gas generators and independent of the first mentioned fans and gas generators.

6. A gas coupling system for a VTOL aircraft comprising, a pair of wing mounted fans and a pair of connected wing mounted gas generators, the fans and gas generators being symmetrically disposed on each side of the longitudinal centerline of the aircraft and each fan receiving some of its power by direct exhaust from each gas generator, a second pair of wing mounted fans and a second pair of connected wing gas generators also being symmetrically disposed about the centerline and adjacent the first fans and gas generators, each fan of said second pair receiving some of its power by direct exhaust from each gas generator of said second pair of gas generators, both pairs of fans and gas generators being independent of each other.

References Cited in the file of this patent

UNITED STATES PATENTS

| 2,899,149 | Breguet | Aug. 11, 1959 |
| 2,939,649 | Shaw | June 7, 1960 |
| 2,990,138 | Shaw | June 27, 1961 |

FOREIGN PATENTS

| 217,516 | Australia | Oct. 10, 1958 |

OTHER REFERENCES

"Convertible Turbojet Engines for VTOL Aircraft," IAS Report No. 59—60; columns 10 and 11, and figure 10 of the drawings, January 29, 1959.